May 18, 1965 P. E. STUCKERT 3,184,715

SWITCHING CIRCUIT FOR MONITORING SIGNALS ON A PLURALITY OF PARALLEL SIGNAL LINES

Filed Dec. 30, 1960 2 Sheets-Sheet 1

INVENTOR
PAUL E. STUCKERT

BY Robert C. Sandt
AGENT

United States Patent Office 3,184,715
Patented May 18, 1965

3,184,715

SWITCHING CIRCUIT FOR MONITORING SIGNALS ON A PLURALITY OF PARALLEL SIGNAL LINES

Paul E. Stuckert, Katonah, N.Y., assignor to International Business Machines Corporation, New York, N.Y., a corporation of New York Filed Dec. 30, 1960, Ser. No. 79,643
7 Claims. (Cl. 340—166)

This invention relates to switching circuits, and more particularly to switching circuits employing bi-stable magnetic elements.

The invention finds particular application in the fields of data processing and communications, although it is not necessarily limited thereto. The environments in which this switching circuit can be advantageously employed can be generically characterized as any in which a large number of signal lines is constantly monitored for the occurrence on any one line of signals having predetermined characteristics, and, upon the detection of such signal that line, or any other desired line, is driven with a responding signal. Generally, such type of operation requires either that considerable equipment be allocated to each individual line, or that if common equipment is shared by all the lines, time must be expended for scanning. The circuits to be described obviate both of these difficulties by monitoring the status of all the signal lines in parallel with a minimum of equipment, as well as providing a minimum of shared drivers, all operable without any loss of time because of required scanning operations.

It is therefore an object of this invention to provide a switching circuit for monitoring the signals on a plurality of signal lines in parallel, and driving any one of the lines upon the occurrence of a predetermined character of signals thereon.

A further object is to provide a switching circuit for monitoring the signals on a plurality of signal lines in parallel, and driving any desired line upon the occurrence of a predetermined character of signal on any other given line.

The foregoing and other objects, features and advantages of the invention will be apparent from the following more particular description of preferred embodiments of the invention, as illustrated in the accompanying drawings.

Figure 1:
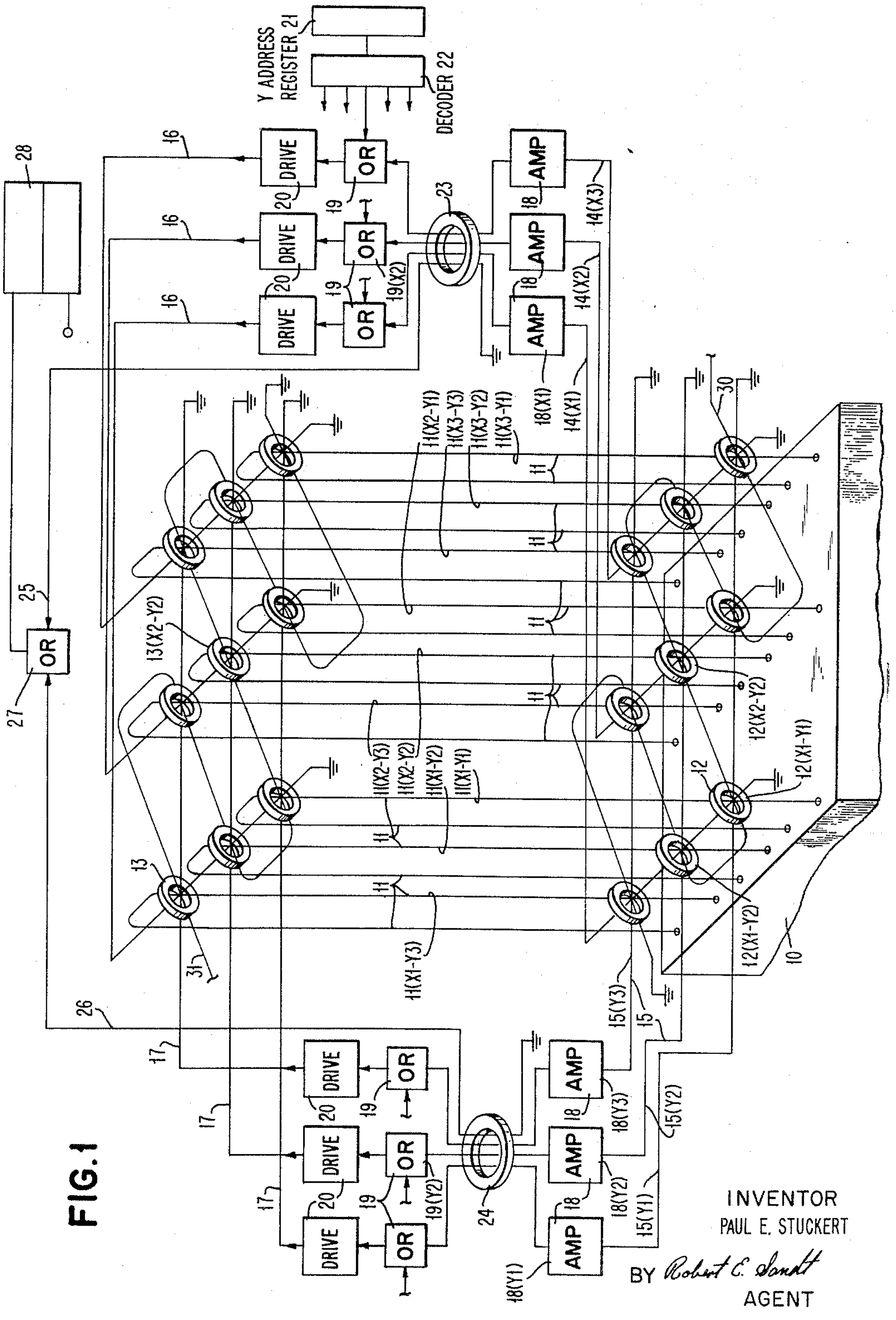
FIG. 1 shows the overall circuit embodiying the invention.
Figure 3A:
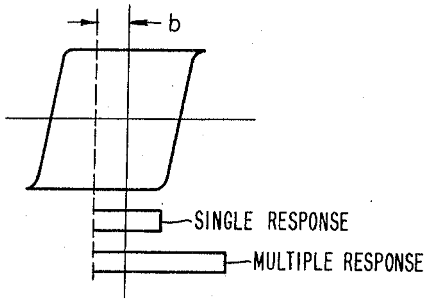
Figure 3B:
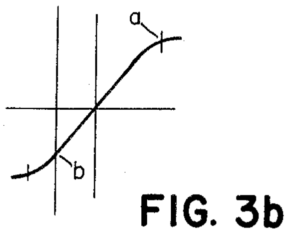

FIGS. 3*a* and 3*b* are hysteresis loops of magnetic materials, the choice of which offers further modifications to FIG. 1.

In FIG. 1 of the drawings, the box 10 represents any equipment or apparatus capable of producing signals on the lines 11, which signals are to be monitored, and the lines 11 to be selectively driven in response to the signal characteristics. A particularly useful application is in an associative memory system similar to that disclosed in copending application Serial No. 61,238, filed October 7, 1960. In that application a question in the form of a desired data bit content is compared with the data bit content of all the data words stored in a memory. Word lines, individual to each data word, respond to the interrogation with signals indicative of the match or mis-match of the respective word bits with the sought bit characteristics. Because of the serial-by-bit nature of the interrogation, the match or mis-match signals appearing on the lines 11 comprise a succession of pulses, there being one pulse for each interrogated bit position. It is the nature of the pulses which determine whether a bit matches the sought bit, and only a complete succession of matching pulses indicates a matching word. Any word found to match is then read from memory by driving the corresponding word line. Although the character of the match and mis-match signals in the referenced application cannot, without modification be directly used in the instant circuit, that memory system has been described briefly here to illustrate a typical application for the circuit. To simplify the understanding, it will be assumed for the purposes of illustration that the lines 11 produce a positive-going signal for a matched bit condition, and a negative-going signal for a mis-matched bit condition. Thus, any word line manifesting a succession of positive signals indicates a matching word and should be driven at the end of the interrogation period to read out the whole data content of the word. Conversely, any word line producing even one negative signal indicates a mismatched word and should not be so driven.

Each of the signal lines 11 is identified by the appended parenthesized coordinates of their respective locations in the 3 x 3 matrix. All other matrical elements are similarly identified. Each of lines 11 is inductively coupled to an individual core in the core plane 12, and to a second individual core in the core plane 13, and returned to the circuits in the box 10. Thus, any signal on the lines 11 will be coupled to a corresponding core in the planes 12 and 13. The cores in the core plane 12 are additionally provided with column and row windings (X and Y windings) 14 and 15, which windings are individually identified by their respective parenthesized X or Y location. A third winding 30 threads all of the cores in the core plane 12 and serves as both a reset and bias winding to affect all cores equally. The threading of the windings in the cores is effected in conventional fashion, which usually employs a single turn coupling each core in the required direction with respect to all other windings threading the core. The cores in the core plane 12 can be simple toroids, and, because they are not required to produce any appreciable power, they can be physically quite small. They are fabricated of magnetic materials having a substantially square hysteresis loop, as is conventional in the art.

Each of the X and Y windings threading the cores in the core plane 12 is connected to a respective serially disposed amplifier 18, "or" circuit 19, and driver 20 to corresponding X and Y windings 16 and 17 threading corresponding cores in the core plane 13. These cores are further provided with a common reset winding 31. The cores in the core plane 13, as they are to furnish driving impulses to the lines 11, would generally be somewhat larger than those in the plane 12, this being a matter of design consistent with the drive impulse strength required.

Thus, each of cores in the core plane 12 and 13 will be threaded with at least four windings. Both planes have X, Y, and signal windings (the lines 11). The plane 12 has a combined reset bias winding 30, and the plane 13 has the reset winding 31, which, if desirable, can also serve as a bias winding. For the nine cores illustrated, there will be three X windings, three Y windings, nine signal windings, and one reset/bias winding per core plane. Similarly there will be three X amplifiers and three Y amplifiers 18, and their attendant "or" circuits 19, and drivers 20. By extrapolation for any number of signal lines, N by N in size, there will be $N^2$ cores per plane, but only 2N amplifiers and drivers. As N becomes increasingly large, the savings in amplifiers and drivers becomes increasingly apparent.

The "or" circuits 19 permit the external addressing and signalling of any one of the lines 11 by the simultaneous energization of one X and one Y "or" through an address register 21 and decoder 22. These "or" circuits and their external second inputs effectively synthesize the response of a core in the core plane 12.

Because of the matrical array of the cores in the plane 13, only a single X and Y winding can be energized at any one time, if a unique output is desired on only one signal winding 11. As the control of the energization of these windings is vested in the signals appearing on the lines 11, insurance must be had that no more than one of the lines 11 responds. To this end, the outputs from the X and Y amplifiers 18 thread the respective cores 23 and 24. As is shown in FIG. 3*a*, these cores may be fabricated of a material having square loop characteristics, or, as is shown in FIG. 3*b*, they may be constructed of a non-square loop magnetic material. In the former instance (square loop material) a current impulse on any one of the lines from amplifiers 18 will produce insufficient current to switch the core 23 or 24. Only if current appears simultaneously on any two or more of these lines will the cores 23 or 24 be switched. This discrimination is simply effected by biasing each of the cores as is shown, by way of example in FIG. 3*a*. Here the bias *b* is sufficient to prevent a single response impulse from switching the core, while the greater magnetizing force produced by multiple responses will exceed the coercive force required to switch the core. Equally well, the cores could be positively biased, and negative magnetizing forces applied, this again being a matter of choice. The outputs from the Y amplifiers 18 are similarly coupled to the core 24. If either of the cores 23 or 24 is switched, the respective sense windings 25 and 26 will detect the change in the remanent state and produce an input to "or" circuit 27, the output of which will act to suppress the drivers 20 to prevent a multiple drive output, and also to switch a "non-unique trigger" 28, which will serve to store the manifestation of the fact that more than one of the signal lines 11 has responded, and act to so inform the equipment 10.

In the non-square embodiment of the cores 23 and 24, as shown in FIG. 3*b*, these cores serve to measure approximately the number of matching words, as well as blocking the readout. For the 3 x 3 matrix shown, a response of any one core in the plane 12 will produce an output response on the corresponding X and Y windings of I amperes. The response of two cores, if the cores are located on the same X or Y winding, will produce 2I amperes in one, and I amperes in each of two other windings. For example, if it is assumed the cores 12(*X1—Y1*) and 12(*X1—Y2*) both produce output responses of I amperes each, then the line 14(X1) will carry the combined responses, or 2I amperes, of the two cores. This response will be amplified in the amplifier 18(X1) and the core 23 will be energized with 2I ampere turns multiplied by the amplification factor. The lines 15(Y1) and 15(Y2) will each carry I amperes to the respective amplifiers 18(Y1) and 18(Y2), whose outputs are linked to the core 24, which will be driven with 2I amperes, multiplied by the amplification factor. Assuming an amplification factor of one (for simplicity's sake only), the core 23 will be driven with 2I amperes, as will the core 24.

If the match-responding cores in core plane 12 are not on common X and Y windings, then two X and two Y windings will each carry a current of I amperes to drive the respective cores 23 and 24 with 2I amperes each (assuming an amplification factor of unity). For example, if both 12(*X1—Y1*) and 12(*X2—Y2*) both respond, lines 14(X1), 14(X2), 15(Y1) and 15(Y2) will each carry I amperes, and the combination of X1 and X2 will drive core 23 with 2I amperes, while Y1 and Y2 will drive core 24 with 2I amperes.

Other multiple responses of the lines 11 will be similarly manifested by drive currents in the cores 23 and 24. For a single matched word, each of the cores will be driven with a force produced by I ampere turns (amplification factor of unity). For two matching words each of the cores will have a flux change therein produced by 2I ampere turns. Three matches will produce 3 ampere turns of flux in both cores 23 and 24. Thus, either of the cores 23 or 24 will experience a flux change, the magnitude of which is approximately a multiple of the number of the lines 11 responding. This multiple response, as measured by the cores 23 or 24, can then be utilized to signal the memory system of the above-identified application, to control the nature of the posed question in accordance with the number of words answering to the sought bit criteria.

If, as explained above, the cores are subjected to flux changes which are a function of the number of word lines 11 registering a match, then through use of a non-square loop material with response characteristics such as that shown in FIG. 3*b*, it is possible to obtain a response from either of these cores indicative of any number of matches by merely coupling into the signal windings 25 and 26 a flux change sensitive circuit. For extending the range of sensitivity for signals of any one polarity, the cores can be biased at any desired level within the linear portion of the B–H characteristic curve, such that a flux change induced by the multiple response of the line 11 will be approximately proportional to the number of lines responding. Thus, if in FIG. 3*b* the core is biased to the point *b* at the bottom of the approximately linear portion of the B–H curve, for positive flux changes, the response range of the core extends from *b* to *a* and the sense windings will manifest an output approximately proportional to the number of inputs. These same bias windings can serve to reset the cores 23 and 24 and fix the reference level.

*Operation*

The cores in the core plane 12 are initially reset to "1" state by application of a reset pulse to the common reset winding 30, threading all of the cores. During the time interval when the lines are producing their impulses it is assumed for the purposes of explanation that all of the lines except 11(*X2—Y2*) have at some time produced one or more negative-going impulses, which impulses indicate that none of these lines has a matching word associated therewith. At the first occurrence of a negative impulse appearing on the respective lines 11, the corresponding core in the core plane 12 will be switched from the "1" to the "0" state. Once any one core is thus switched, it will remain so switched. The core 12(*X2—Y2*) however, will alone remain in its reset "1" state because the line 11(*X2—Y2*) has experienced no negative pulses during the sampling period. Although the switching of any core in plane 12 during the sampling period will produce a response in the X and Y windings coupled thereby, these responses are rendered ineffective by biasing the amplifiers to cutoff during the sampling period. To prevent the reswitching of any core by the occurrence of a negative pulse followed by a positive pulse, the cores are all biased by application of current of a suitable magnitude to the winding 30 to permit negative impulses to switch the cores from the "1" to the "0" but to prevent positive impulses from switching the cores from "0" to "1."

At the end of the sampling period a set pulse is applied to the reset winding 30 threading all of cores in the plane 12. This pulse is of a magnitude and direction such that it wil set any core in the "1" remanent state to the "0" state. As all of the cores in the plane 12 except 12(*X2—Y2*) are in the "0" remanent state, by virtue of the character of signals appearing on these lines during the sampling period, the set pulse will have no switching effect thereon.

These cores, therefore, because of their square-loop material will produce substantially no output on their respective X and Y windings. The core 12(*X2—Y2*), however, alone remains in the "1" state, and the set impulse, when applied, produces a response in the X winding 14(X2) and in the Y winding 15(Y2). These responses are now effective to be amplified in the respective amplifiers 18(X2) and 18(Y2), these amplifiers now being unblocked by removal of the cutoff bias thereto. The amplified responses will be passed by "or" gates 19(X2) and 19(Y2) to energize the drivers 20 (X2) and 20(Y2). The outputs from these drivers are so adjusted that their combined outputs are required to switch the core 13(*X2—Y2*) in the well-known coincident current selection technique for switching magnetic cores. Thus, only the core 13(*X2—Y2*) will be switched from its reset state to produce an output response in the winding 11(*X2—Y2*) which is the line that produced the initiating response in the first instance.

The cores in the core plane 13 are all initially reset to either the "0" or "1" state, this being a matter of choice and dependent on the polarity of the drive pulse desired upon the selected line 11. The switching of core 13(*X2—Y2*) by coincident currents in the X and Y windings associated therewith will induce a magnetizing force in the core 12(*X2—Y2*). However, if this core is in the same remanent state to which the current in line 11(*X2—Y2*) seeks to drive it, there will be substantially no flux change in that core, and no outputs to the amplifiers tending to induce regeneration. If the core is in the opposite state so as to undergo a substantial flux change, the amplifiers can be blocked at this time to prevent regeneration. Alternatively, bias can be applied to the winding 30 to prevent the switching of any core in the plane 13 from switching the corresponding cores in the plane 12. It is to be further noted that because of the larger physical size of the cores in the plane 13 relative to those in the plane 12, the initial signal pulses appearing on the lines 11 will only switch the cores in the latter plane and will not switch the cores in plane 13. Alternatively, a bias selectively applied to the winding 31 during the sampling period will prevent these cores from being affected by the signal pulses on lines 11.

Upon completion of the drive line 11(*X2—Y2*), the cores in both planes 12 and 13 are reset to their respective predetermined states which are a function of the polarities desired. Such reset in the example chosen will reset core 13(*X2—Y2*) and all of the cores in plane 12. The circuit is now available for a further sampling operation.

As will be readily apparent from the foregoing description, the selective drive of any one of the lines 11 requires coincident impulses on one of the lines 16 and 17. These can be produced by the operation just described, or by operation of the appropriate "or" gates 19. For example, to drive the line 11(*X2—Y2*) the "or" gates 19(X2) and 19(Y2) would be simultaneously energized by the decoder 22 through control of an address register 21.

As a further modification it is possible to drive any one of the lines 11 in response to a signal on any other given line. Through the introduction of well-known selectively controllable column or row shift devices in the lines 16 and 17, the controlled selective drive of any other line can be simply effected. For example, if, as before the line 11(*X2—Y2*) responds with a matching signal, a plus one shift on the X lines 16 will produce a drive on line 11(*X3—Y2*). Similarly a plus one Y shift would drive 11(*X2—Y3*), and a plus one X shift and a plus one Y shift would drive line 11(*X3—Y3*).

With the 3 x 3 matrix shown for purposes of illustration, the savings in drivers is relatively small. As was previously explained the saving becomes increasingly greater as the number of lines increases. A further saving is realized with respect to the "non-unique" detectors. Here for a matrix of N by N a single detector with $N^2$ inputs is necessarily more complex than the two detectors such as the cores 23 and 24 with only N inputs each.

Figure 2:
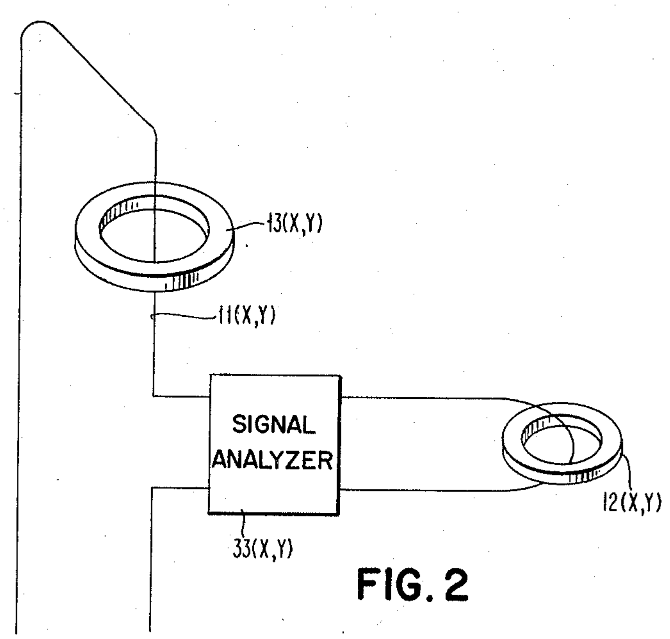
FIG. 2 shows a modification for detecting signals of any predetermined characteristic.

As has been explained, each of the cores in the core plane 12 serves as both a signal discriminator and switching element. Other more complicated patterns of signals can be handled by connecting to each of the lines 11 any of many well-known signal analyzers in the manner shown in FIG. 2. Here each of the lines 11(X, Y) is connected to a signal analyzer 33(X, Y) which produces an output to switch the core 12(X, Y) upon the occurrence of a succession of pulses, or a standard of signals mis-matching any arbitrary standard. The cores in the core plane 12, except for the modification shown, have the same windings as in FIG. 1, there being one core 12 per signal line 11, and one analyzer 33 per line. The signal analyzer 33 could for example be a code integrity checking device, and would produce continuous outputs indicating that valid signals are being received. Any invalid signal on a line would fail to produce a signal, and the circuit of FIG. 1, as modified by FIG. 2, would then become operative to produce a signal on the invalid signal producing line to order the remote transmitted to check and re-transmit its data. It is not, however, except in the instance first described, of particular moment what type of signal checking is adopted, as this is a matter of choice dictated by the character of the signals themselves. It is only after one of the lines is distinguished from all others as requiring individual treatment that the instant circuit realizes its full intent.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A switching circuit, comprising (*a*) A first and second array of bi-stable elements;

(*b*) means for establishing all of the elements in each respective array in a given one of their respective states of stability as a reset state;

(*c*) a plurality of signal-bearing lines, each of which is operatively associated with a corresponding one element in each of said arrays;

(*d*) means coupling each signal line with its associated element in said first array, and operative responsive to the occurrence of a predetermined character of signals on the line to switch the associated element from its reset to its opposite state of stability;

(*e*) means applying a common switching influence to all the elements in said first array, and operative to change the state thereof from their reset to their opposite state;

(*f*) a plurality of pairs of drivers, each pair of which is operatively associated with the corresponding one element in each of said arrays;

(*g*) means coupling each said pair of drivers to the corresponding element in said first array, and operative responsive to the change in state of the element, induced by said switching influence to produce a pair of output responses;

(*h*) means coupling each element in said second array to its corresponding pair of drivers, and operative responsive only to the simultaneous occurrence of said pair of output responses to change the coupled element from its reset stable state;

(*i*) means coupling each signal line to the corresponding element in said second array, and operative responsive to the change in state thereof induced by the coupled pair of drivers to produce a control impulse on the coupled line;

(*j*) and means responsive to the switching by said switching influence of more than one element in said first array to render said drivers inoperative.

2. A switching circuit, comprising (*a*) a first and second array of bi-stable elements;

(*b*) means for establishing all of the elements in each respective array in a given one of their respective states of stability as a reset state;

(*c*) a plurality of signal-bearing lines, each of which is operatively associated with a corresponding one element in each of said arrays;

(d) means coupling each signal line with its associated element in said first array, and operative responsive to the occurrence of a predetermined character of signals on the line to switch the associated element from its reset to its opposite state of stability;

(e) means applying a common switching influence to all the elements in said first array, and operative to change the state thereof from their reset to their opposite state;

(f) a plurality of pairs of drivers, each pair of which is operatively associated with the corresponding one element in each of said arrays;

(g) means coupling each said pair of drivers to the corresponding element in said first array, and operative responsive to the change in state of the element, induced by said switching influence to produce a pair of output responses;

(h) means coupling each element in said second array to its corresponding pair of drivers, and operative responsive only to the simultaneous occurrence of said pair of output responses to change the coupled element from its reset stable state;

(i) means coupling each signal line to the corresponding element in said second array, and operative responsive to the change in state thereof induced by the coupled pair of drivers to produce a control impulse on the coupled line;

(j) and means responsive to the switching by said switching influence of more than one element in said first array to produce a manifestation of the number of said elements thus switched and to render said drivers inoperative.

3. In combination, (a) a plurality of lines bearing signals of varying polarity and amplitude;

(b) a first and second array of bi-stable magnetic switching elements, each array comprised of the same number of elements;

(c) means coupling each of said lines with a corresponding one element in each of said arrays and operative responsive to the signals appearing on said lines to switch the magnetic state of the coupled corresponding elements in said first array;

(d) a plurality of pairs of separate windings coupling each of the elements in said first array, such that each separate winding couples a plurality of elements, and each element is coupled with a different pair of windings;

(e) a plurality of separate windings coupling the elements in said second array in the same fashion that the elements in said first array are coupled by their respective windings;

(f) a plurality of drivers having input and output terminals, the input terminal of each driver being operatively coupled to a respective one of said separate windings coupling the elements of said first array, and the output terminal of each driver being operatively coupled to the winding in the second array corresponding to the winding in the first array to which the input terminal is coupled;

(g) a winding coupling all of the elements in said first array;

(h) a winding coupling all of the elements in said second array;

(i) means for applying current to the respective windings coupling all the elements in said first and second arrays to reset them to a reference stable state;

(j) means for applying a bias current to the winding coupling all the elements in said first array and operative to prevent the signals appearing on said lines from switching the elements from their non-reset stable state to their reset stable state;

(k) means for applying to the winding coupling all elements in said first array a current tending to switch all elements from their reset stable state to their stable state so as to switch those elements not previously switched by said signals;

(l) means operative responsive to the change in state of any one element in said first array induced by said last-named current to render the drivers coupled thereto operative to produce output pulses on the respective output terminals, the magnitudes of which pulses are such that the joint operation of two pulses is alone operative to switch that element coupled to the output terminals of the operated drivers, the switching of the element being operative to produce a control impulse on the signal line coupled thereto.

4. The combination of (a) a plurality of lines bearing signals;

(b) analyzing means coupled to each of said lines and operative to produce an output for each line when the signals thereon have a predetermined characteristic;

(c) a first array of bi-stable magnetic switching elements;

(d) means coupling the analyzing means with each of the elements in said first array such that the output for each line is coupled to a different one of said elements, and is operative to change the stable state thereof;

(e) a second array of bi-stable magnetic elements having the same number of elements as said first array; means coupling each signal line with a different one of the elements in said second array;

(f) a plurality of pairs of separate windings coupling the elements in said first array such that each separate winding couples a plurality of elements, and each element is coupled by a different pair of windings;

(g) a plurality of pairs of separate windings coupling the elements in said second array in the same fashion that the elements in said first array are coupled by their respective windings;

(h) a plurality of drivers having input and output terminals, the input terminal of each driver being operatively coupled to a respective one of said separate windings coupling the elements of said first array, and the output terminal of each driver being operatively coupled to the winding in the second array corresponding to the winding in the first array to which the input terminal is coupled;

(i) a common winding coupling all of the elements in said first array;

(j) a common winding coupling all the elements in said second array; means for applying currents to the respective common windings coupling the elements of both arrays to reset the elements to a reference stable state;

(k) means for applying a current to the common winding coupling all elements in said first array tending to switch all elements from their reset stable state to their stable state so as to switch those elements not previously switched by the output from said analyzing means;

(l) and means operative responsive to the change in state of any one element in said array, induced by said last-named current, to render the drivers coupled thereto operative to produce output pulses on the respective output terminals, the magnitudes of which pulses are such that the joint operation of two pulses is alone operative to switch that element coupled to the output terminals of the operated drivers, the switching of the element being operative to produce a control impulse on the signal line coupled thereto.

5. The combination of claim 4 wherein the means operative responsive to the change in state of any one element in said array, induced by said last-named current, to render the drivers coupled thereto operative to produce output pulses on the respective output terminals includes (a) a first bi-stable magnetic element coupled by the first windings from each pair of windings coupling each element in said first array;

(b) a second bi-stable element coupled by the second winding from each pair of windings coupling each element in said first array, said last named first and second elements having a flux bias such that the switching response of more than one element in said first array is alone operative to switch the first and second elements;

(c) and means responsive to the change in state of said last named first or second element for preventing operation of said drivers.

6. The combination of (a) a plurality of signal-bearing lines;

(b) means for detecting a predetermined signal status on each of said signal lines, and operative to produce an individual manifestation of such detection for each said line;

(c) means for detecting the presence of a plurality of said manifestations;

(d) a plurality of encoding instrumentalities combinatorially energized in response to each such manifestation, such that a different combination of instrumentalities is energized for each separate manifestation;

(e) decoding means operative responsive to the combinatorial energization of said instrumentalities to produce an output response on one of a plurality of output lines;

(f) means coupling each of said output lines with a corresponding one of said signal lines;

(g) and means responsive to said means for detecting the presence of a plurality of manifestations for rendering said decoding means inoperative to produce an output response.

7. The combination of (a) a plurality of signal-bearing lines;

(b) means for detecting a predetermined signal status on each of said signal lines, and operative to produce an individual manifestation of such detection for each said line;

(c) means for detecting the presence of a plurality of said manifestations;

(d) a plurality of encoding instrumentalities combinatorially energized in response to each such manifestation, such that a different combination of instrumentalities is energized for each separate manifestation;

(e) decoding means operative responsive to the combinatorial energization of said instrumentalities to produce an output response on one of a plurality of output lines;

(f) means coupling each of said output lines with any other of said signal lines;

(g) and means responsive to said means for detecting the presence of a plurality of manifestations for rendering said decoding means inoperative to produce an output response.

References Cited by the Examiner

UNITED STATES PATENTS

| | | | |
|---|---|---|---|
| 2,939,119 | 5/60 | Einsele | 340—166 X |
| 2,975,406 | 3/61 | Stallard | 340—166 |
| 2,981,931 | 4/61 | Tate | 340—166 |
| 2,988,732 | 6/61 | Vinal | 340—166 |
| 2,991,454 | 7/61 | Hammer | 340—166 |

NEIL C. READ, *Primary Examiner.*

STEPHEN W. CAPELLI, *Examiner.*